E. P. NOLE.
PIPE COUPLING.
APPLICATION FILED NOV. 25, 1908.
917,111.
Patented Apr. 6, 1909.
2 SHEETS—SHEET 1.
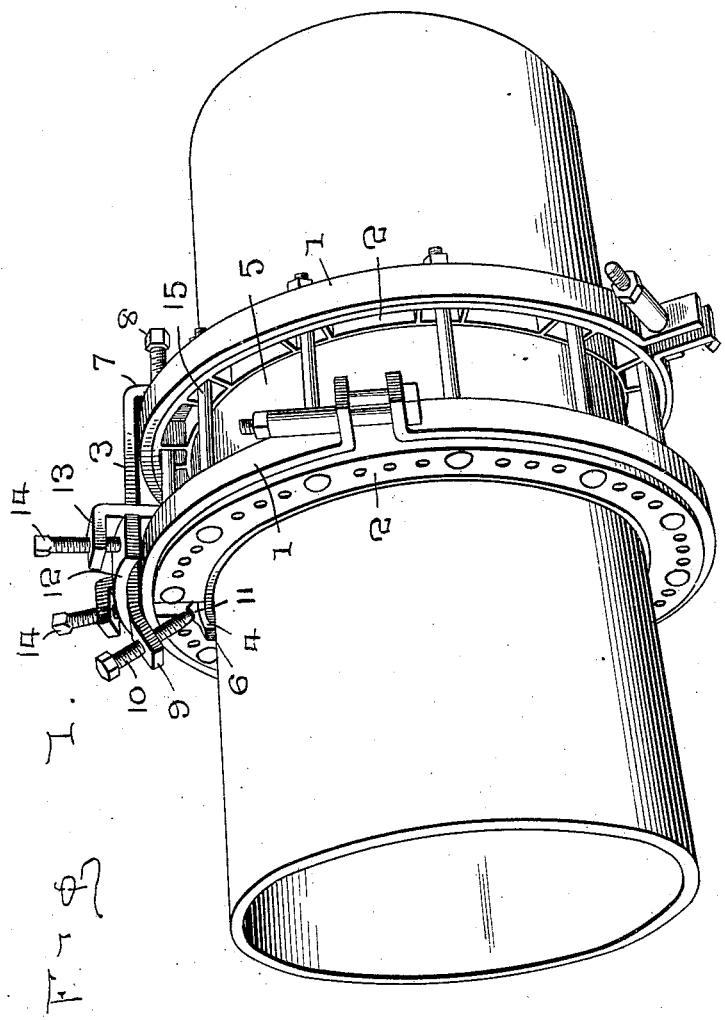
WITNESSES:
Thos. W. Riley
M. A. Newcomb
INVENTOR
E. P. Nole
BY
W. J. FitzGerald & Co
Attorneys E. P. NOLE.
PIPE COUPLING.
APPLICATION FILED NOV. 25, 1908.
917,111.
Patented Apr. 6, 1909.
2 SHEETS—SHEET 2.
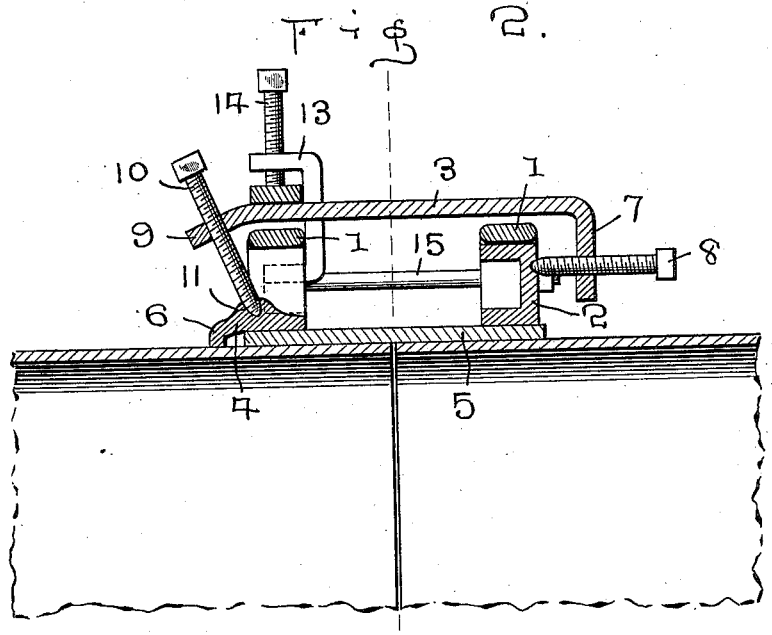
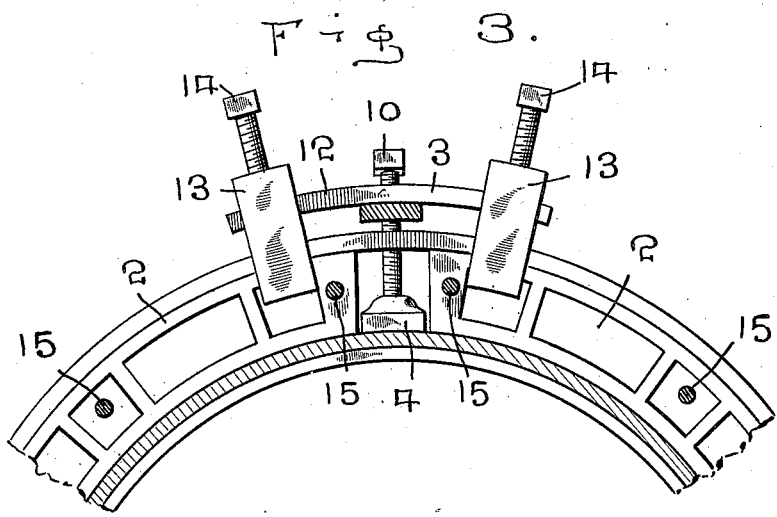
WITNESSES:
Thos. W. Riley
M. A. Newcomb
INVENTOR
E. P. Nole
BY
W. J. FitzGerald & Co
Attorneys

UNITED STATES PATENT OFFICE.

EDWARD PAGE NOLE, OF BELLE VERNON, PENNSYLVANIA.

PIPE-COUPLING.

No. 917,111.  Specification of Letters Patent.  Patented April 6, 1909.

Application filed November 25, 1908. Serial No. 464,378.

*To all whom it may concern:*

Be it known that I, EDWARD P. NOLE, a citizen of the United States, residing at Belle Vernon, in the county of Fayette and State of Pennsylvania, have invented certain new and useful Improvements in Pipe-Couplings; and I do hereby declare the following to be a full, clear, and exact description of the invention, such as will enable others skilled in the art to which it appertains to make and use the same.

My invention relates to new and useful improvements in pipe couplings, and my object is to provide more particularly against the accidental displacement or blowing out of the rubber gasket or packing applied to the joint between pipe sections.

A further object is to carry out these ends in an effective, expeditious and economical manner and to provide for the ready application of the device for use.

Other objects and advantages will be hereinafter referred to and more particularly pointed out in the claims.

In the accompanying drawings which are made a part of this application, Figure 1 is a perspective view of my invention, as applied for practical use. Fig. 2 is a broken longitudinal section. Fig. 3 is an end view partly in section taken on the dotted line indicated in Fig. 2.

In describing the invention in detail, reference will be had to the accompanying drawings forming part of this application, wherein like characters of reference denote corresponding parts in the several views.

In carrying out my invention, I employ, in connection with the usual annular member or ring 1, of the split type, and an additional like member 2 of a pipe coupling, an annular member or bracket 3 and a plate or base member 4.

The rings or members 1 and 2 are duplicated and spaced apart oppositely to a line passing between the meeting ends of the pipe sections and encompassing said pipe sections, is a rubber packing or gasket 5 adapted to cover the joint formed by the meeting ends of said sections and arranged so as to be encompassed by said ring or annular members above referred to, as usually practiced in applying said packing or gasket for the purpose indicated.

The plate or member 4 is adapted to engage the rubber packing or gasket 5 for clamping the latter in place and has one end bent or extended inwardly toward the pipe section, as at 6, said bent end bearing upon the latter. The member 3 has one end at a right angle to its main portion as at 7 to receive a holding screw 8 engaging laterally one of the ring members 2 for the retention of that end of said member or bracket 3, as more particularly indicated in Fig. 2.

The member or bracket 3 has its opposite end or terminal deflected or inclined inwardly or toward the pipe sections as at 9 and through said deflected portion or terminal, is threaded a holding screw 10 received at its point or inner end in a socket or cavity 11 in the upper surface of the plate 4.

It will be noted that the screw 10 by reason of the deflected or inclined terminal 9 of the member or bracket 3 is adapted to occupy and be received in its socket 11 in the plate 6 in an inclined position to permit its convenient application in the split of one of said ring members and for readily securing the plate member 4 in place upon the rubber gasket or packing at that point, as will be seen from Figs. 1 and 2.

A plate or yoke 12 is applied transversely to the member or bracket 3 and upon its upper surface and is held thereon by opposite preferably approximately U-shaped keepers or brackets 13, equipped with holding screws 14 impinging or engaging said yoke member for the effective retention of the bracket member 3 as against outward displacement from the pressure exerted thereon by the screw 10 in securing the plates 4 in position.

It will be noted that the application of the pressure of the screws 14 is delivered upon the yoke 12 laterally and upon opposite sides of the bracket 3 as required for the retention of said yoke member in its superposed position upon said bracket 3, as will be readily understood.

It will be understood that the means of connection, as the employment of nut-equipped bolts 15 between the ring members 2, is the same as usually heretofore employed for that purpose and therefore constitutes no part of this invention, nor do the ring members constitute any essential feature thereof.

It will be understood, that as above indicated, the clamp forming device, including the plate member 4, and its retaining screw or bolt for said plate member, together with adjunctive parts, provides for the effective holding of the rubber gasket or packing upon the pipe sections against being forced or blown laterally from its position thereon by the pressure within the pipe sections, at the joint, as would otherwise be liable to be the case and as has been experienced in practical use and which it is found is effectively remedied by the use of said clamping device, forming the subject matter of my invention.

I claim:

1. The combination with a coupling of the class described, of a clamp having meeting ends and a packing between said ends, said clamp having an angular terminal adapted to bear upon said packing, a bracket, means for holding said bracket upon said coupling, said bracket having a deflected or inclined terminal, a retaining screw passed through said terminal and engaging said clamp and means for holding said bracket against the thrust of said clamp holding screw.

2. A device of the character described, comprising a coupling a packing, an angular plate adapted to engage said packing and having a socket in its upper surface, a bracket right-angled in general outline and having a deflected or inclined terminal, a holding screw passing through one arm of said bracket for engagement with said coupling, a bolt or screw threaded through said bracket and engaging the socket in said angular packing engaging plate and means for the retention of said bracket in effective position as against the thrust of said angular plate.

3. A device of the character described, comprising a coupling including a packing member and a clamp and an angular plate adapted to engage said packing and having a socket in its upper surface, a bracket, means for holding said bracket on said coupling, a holding screw threaded in said bracket and engaging said angular plate, a transverse yoke member resting upon said bracket and keepers engaging said coupling and equipped with screws or bolts engaging said yoke member.

In testimony whereof I have signed my name to this specification in the presence of two subscribing witnesses.

EDWARD PAGE NOLE.

Witnesses:
CLYDE BEAL,
JOS. T. ROLEY.